March 21, 1961 TAKUYA NASU 2,976,353

TUNING INDICATOR SYSTEM FOR INTERCARRIER TELEVISION

Filed Sept. 26, 1956 3 Sheets-Sheet 1

TUNING INDICATOR SYSTEM FOR INTERCARRIER TELEVISION

Filed Sept. 26, 1956 3 Sheets-Sheet 2

March 21, 1961 TAKUYA NASU 2,976,353

TUNING INDICATOR SYSTEM FOR INTERCARRIER TELEVISION

Filed Sept. 26, 1956 3 Sheets-Sheet 3

United States Patent Office 2,976,353

Patented Mar. 21, 1961

2,976,353

TUNING INDICATOR SYSTEM FOR INTER-CARRIER TELEVISION

Takuya Nasu, 80 3-Chome, Morishoji-Naka, Asahi-ku, Osaka-shi, Osaka-fu, Japan

Filed Sept. 26, 1956, Ser. No. 612,180

Claims priority, application Japan Oct. 3, 1955

4 Claims. (Cl. 178—5.8)

This invention relates to tuning systems and more particularly to systems for visibly indicating the tuning of local oscillators in television receivers of the inter-carrier-sound system type.

Almost all conventional receivers are of the inter-carrier-sound system type which is characterized principally by the fact that the drifting of the local oscillator frequency has no effect upon a sound output. On account of this characteristic, the disadvantage is encountered that, in the case of the fine tuning of local oscillator frequency by an operator it is rather difficult to determine proper tuning as either the picture or the sound may be reproduced over a substantial range of frequencies. Therefore, the operator is forced to find the condition of optimum picture quality by observing the picture condition. Besides, if experience is lacking in the operation of finding optimum quality, it is very difficult to determine tuning by the picture condition only. Thus, low quality pictures are frequently obtained.

In order to overcome this disadvantage, the provision of a means for indicating tuning is important. It is impossible, however, to find a tuning signal in a television receiver as simply as in a radio receiver because the tuning to the maximum gain of a video carrier does not necessarily coincide with maximum quality in a video receiver.

It is known to provide a sharply tuned element for the intermediate frequency of the video carrier or the sound carrier in the I.-F. amplifier stage, and a tuning indication can be obtained from the energy of the induced carrier in that element. A conventional receiver has an element called a "sound-trap" to be tuned with the sound intermediate frequency for another purpose. In principle, the energy of an induced sound carrier in the sound-trap may be utilized. It is unfortunately insufficient, however, to use the energy for controlling a tuning indicator device without amplification because the magnitude of the energy is too small. Moreover, it is undesirable to supplement the amplifier stage in view of the cost involved.

A method was proposed whereby an additional tuning element sharply tuned to the video carrier is provided. According to this method, unless an uneconomical buffer stage is also provided, the frequency characteristic of the I.-F. amplifier is deteriorated due to the adsorption effect of the additional tuning element, and the picture quality consequently is harmed. Even if this method is effected practically, it is a disadvantage from a cost view point to provide an additional element unnecessary directly to the proper functioning of a receiver. Furthermore, when the element becomes misadjusted in the customer's hands (and there is every probability of such a case), the customer may have considerable difficulty because of the additional element.

The features of this invention include providing a system whereby a tuning signal is obtained without an additional tuning element as above, providing a simplified system for tuning indication in a receiver having a sound-trap in its I.-F. amplifier stage, and providing a method for attaining a tuning indication whereby the brightness of the picture tube itself is controlled by the tuning signal hence omitting additional indicator tubes. Furthermore, it is also an object of this invention to provide a system whereby the above objects may be attained extremely economically.

In describing the invention reference will be made to the accompanying drawings in which.

Figure 1:
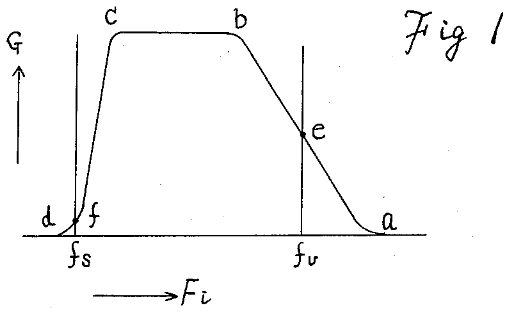
Figure 1 shows an ideal frequency characteristic for an I.-F. amplifier in a television receiver of the intercarrier-sound system type.

In Fig. 1, the abscissa $F_1$ shows the intermediate frequency and the ordinate G shows the gain of amplification. Along the abscissa, the points $f_v$ and $f_s$ show the normal positions of the frequencies of the video carrier and the sound carrier. It is well known that the gain of the video carrier $f_v$ is adjusted so as to be found at the point *e* which is located at 50 percent of the height of the level *bc* of the characteristic curve *a—b—c—d*, and the gain of the sound carrier $f_s$ is adjusted so as to be found at the point *f* which is located at a position corresponding to several percent of the maximum height of the curve. Now let it be assumed that the local oscillator frequency is shifted. In accordance therewith the video carrier $f_v$ and the sound carrier $f_s$ shift at the same time so as to shift laterally along the abscissa keeping a constant frequency interval (4.5 mc. by present standards) between themselves. Accordingly, the levels of the points *f* and *e* which represent gains of amplification of the two carriers $f_v$ and $f_s$ vary depending upon the shape of the characteristic curve *a—b—c—d*.

Figure 2:
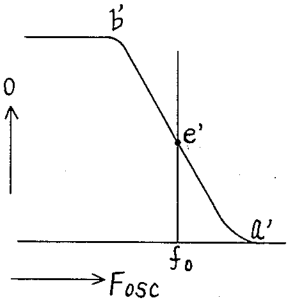
Figure 2 shows a mode of variation of the output of the video I.-F. carrier according to a shifting of its frequency.
Figure 3:
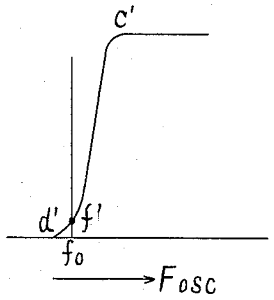
Figure 3 shows a mode of variation of the output of the sound I.-F. carrier according to a shifting of its frequency.

Assuming that it is possible to use the two outputs which represent individually the two energies of the video carrier $f_v$ and the sound carrier $f_s$ passing through the I.-F. amplifier, said outputs vary depending upon the characteristic curve *a—b—c—d* in accordance with the shifting of the local oscillator frequency. Figs. 2 and 3 show the mode of the variation of the two outputs, wherein the abscissae $F_{osc}$ show the local oscillator frequencies, the ordinates O show the outputs, and the points $f_0$ on the abscissas in both figures show identical normal frequency of the local oscillator. That is, the curve *a'b'* in Fig. 2 and the curve *c'd'* in Fig. 3 correspond to the portions *ab* and *cd* of the characteristic curve *a—b—c—d* of Fig. 1, respectively.

Figure 4:
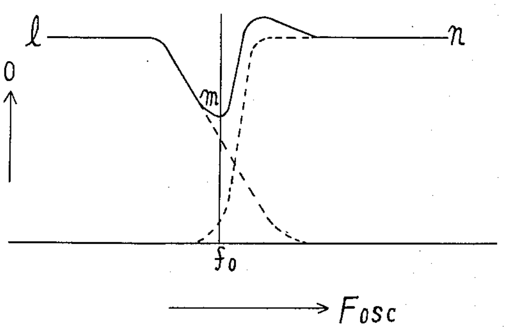
Figure 4 shows a mode of variation where the above two outputs are added up.

In Fig. 4, the two outputs shown in Figs. 2 and 3 are shown being superposed in additive relation. It may be seen clearly that an apparent minimum point *m* is found in the proximity of the desired or normal tuning point $f_0$ of the local oscillator frequency along the composite output curve $l$—$m$—$n$. Therefore, the normal tuning point of the local oscillator frequency may be indicated by means, for example, of controlling a visible indicator device such as an electronic indicator tube utilizing the output shown by the output curve $l$—$m$—$n$ as the tuning signal. Furthermore, although it is not certain that the minimum point of curve $l$—$m$—$n$ locates exactly in conformity with the position of the normal tuning point $f_0$, it is easy to make the required fine adjustment once the tuning has been adjusted as indicated above. Particularly, where a sound-trap is provided in the I.-F. amplifier as set forth hereinafter, the minimum point $m$ is indicated more precisely.

Figure 5:
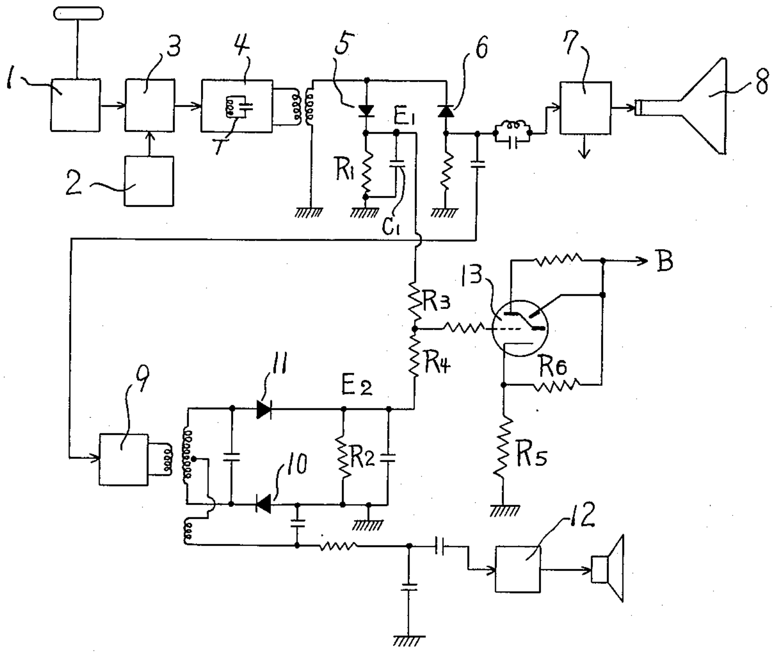
Figure 5 is a schematic diagram of a television receiver circuit of the intercarrier-sound system type wherein this invention is embodied.

Referring to Fig. 5 showing a schematic diagram of a television receiver circuit of the intercarrier-sound system type and including an embodiment of this invention, the circuit comprises a R.-F. amplifier 1, a local oscillator 2, a frequency converter 3, an I.-F. amplifier 4, a diode 5 for rectifying the video-carrier, a diode 6 as the video detector, a video amplifier 7, a picture tube 8, a sound I.-F. amplifier 9, diodes 10 and 11 in a ratio-detector circuit, an audio amplifier 12, and a tuning indicator tube 13. In the above circuit, the rectifying circuit consisting of the diode 5, a resistance $R_1$, and a capacitance $C_1$ is a well known peak-value-type rectifying circuit. Across the tank circuit of $R_1C_1$, a direct current potential $E_1$ is formed which corresponds to the peak value of the synchronizing pulses in the video-carrier. Therefore, the D.-C. potential $E_1$ varies in accordance with the mode shown in Fig. 2 with the shift of the local oscillator frequency and can be used as one component of the tuning signal. On the other hand, the second I.-F. carrier (4.5 mc.) is obtained from the video detector and is a beat between the video carrier and the sound carrier passed through the I.-F. amplifier 4. Now since the level of the sound carrier is low enough compared with the level of the video carrier as clearly shown in Fig. 1, the variation in energy of the second sound I.-F. carrier substantially represents the variation in energy of said sound carrier $f_s$. Therefore, converting the second sound I.-F. carrier into a direct current potential by rectification after it is amplified suitably, an output in D.-C. potential corresponding to the output shown in Fig. 3 is obtained. Fortunately, across the load resistance $R_2$ in the ratio-detector circuit provided in the conventional receiver, a D.-C. potential $E_2$ in proportion to the energy or the amplitude of the sound carrier may be obtained so that, if there is no amplitude-limiter stage in the second sound I.-F. amplifier 9, it is possible to utilize the D.-C. potential $E_2$ across the resistance $R_2$ as the other component of the signal. According to this embodiment, said D.-C. potentials $E_1$ and $E_2$ are superposed one on the other in parallel through resistances $R_3$ and $R_4$, respectively, and made to control an indicator tube 13, the ratio between the two D.-C. potentials being adjustable suitably by means of varying the ratio between the resistances $R_3$ and $R_4$. Resistances $R_5$ and $R_6$ initially provide the necessary bias voltage to the indicator tube 13.

Figure 6:
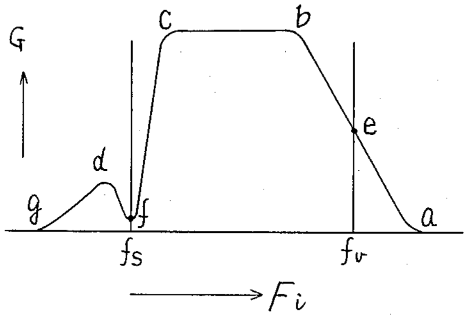
Figure 6 shows a typical frequency characteristic of the I.–F. amplifier having a sound-trap in a receiver.

Although the explanation given above is based on the hypothetical curve $a$—$b$—$c$—$d$ as shown in Fig. 1, it is usual that a sound-trap be provided in the I.-F. amplifier 4 for the purpose of attenuating the sound carrier. Thus, an apparent minimum point $f$ is generally found at the position $f_s$ of the sound carrier along the I.-F. characteristic curve $a$—$b$—$c$—$f$—$d$—$g$ by virtue of the absorption effect of the sound-trap and of the residual gain in the outer side of the band, as shown in Fig. 6. Therefore, the curve $c'$—$f'$—$d'$ in Fig. 3 becomes the curve $c'$—$f'$—$d'$—$g'$ in Fig. 7, and the curve $l$—$m$—$n$ in Fig. 4 becomes, in turn, the curve $l'$—$m'$—$n'$ in Figure 8. As may be seen clearly by the composite output curve $l'$—$m'$—$n'$, it is possible to conform the minimum point $m'$ to the normal position of the tuning point $f_0$ easily and completely.

Figure 7:
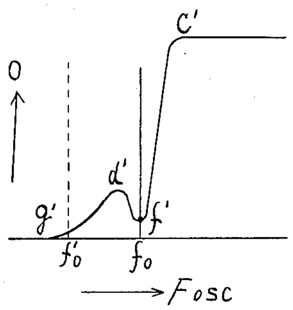
Figure 7 shows a mode of variation of the output of the sound I.–F. carrier in the case shown in Fig. 6.
Figure 8:
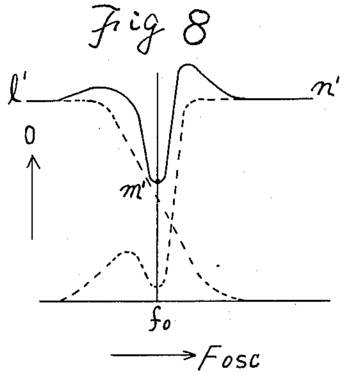
Figure 8 shows a mode of variation where the two outputs in the case shown in Fig. 6 are added up as in Fig. 4.
Figure 9:
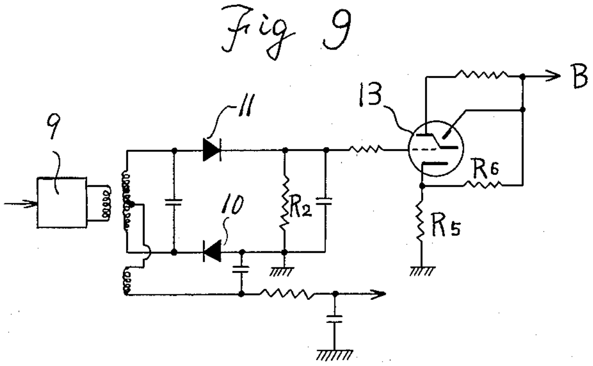
Figure 9 shows a circuit provided in accordance with this invention and depending upon the absorption effect of the sound-trap referred to in Fig. 7.

According to another embodiment of this invention, a further simplified method is provided wherein, depending only upon the absorption effect of the sound-trap while eliminating the superposition of the output shown in Fig. 2, only the output shown in Fig. 7 is utilized as the tuning signal. Fig. 9 shows a circuit arranged in accordance with this further embodiment of the invention. The operation thereof may be understood in view of the explanation given hereinbefore without further description which has therefore been omitted. When the local oscillator frequency in this circuit is shifted to the point $f_0'$ shown by a dotted line in Fig. 7, the output is lowered to the level of the minimum point $f'$ or further. However, a steep slope is found in the proximity of the normal tuning point $f'$ so that an operator can easily distinguish the two variations. When a system according to this invention is employed in a receiver provided with a sound trap as described above, it is possible to tune the sound I.-F. carrier with the sound-trap easily and exactly so that the receiver is always operated under ideal conditions predetermined by the manufacturer, preventing the occurrence of buzz and so forth completely. Therefore, it is possible to eliminate the amplitude-limiter stage without any trouble despite the fact that this stage is usually needed in second I.-F. amplifier in a prevalent receiver. Accordingly, since it is possible to obtain a tuning signal from an available ratio-detector circuit and to eliminate the amplitude-limiter stage, there is substantially no influence exerted on costs even if an indicator tube is additionally required.

According to this invention, it is also possible to indicate tuning without an indicator tube by using the brightness of the picture tube itself which is controlled by the tuning signal as described above. Thus, it is unnecessary in principle to provide any additional indicator device which is replaced by, for example, adapting the brightness of the picture to the normal brightness at the normal tuning point by superposing the tuning signal on the brightness-control input to the picture tube.

In summary, the invention is characterized in that the tuning signal is readily found by utilizing characteristics provided in attaining the proper functioning of the receiver itself. No additional tuning element or pick-up coil is used, so that there is almost no cost difference. Besides, since the mode of operation of the indicator also depends upon the characteristics of the receiver itself, it may serve not only as a tuning indicator, but as a condition indicator of the characteristics of various parts of the receiver such as, for example, the I.-F. amplifier or the sound-trap. The employment of the invention will result in receivers provided with tuning indicators at low costs and will enable the enjoyment of a picture of maximum quality at any time and facilitate maintenance.

There will now be obvious to those skilled in the art many variations of the circuits set forth which do not depart essentially from the spirit of the invention as defined in the claims.

I claim:

1. A tuning indicator, for a television receiver of the intercarrier sound system type in which intermediate frequency signals are passed through an intermediate frequency amplifier and a video detector for obtaining a tuning signal, comprising first and second means respectively connected to said intermediate frequency amplifier and said video detector for deriving direct current potentials varying in accordance with the magnitudes of the signals therein, control means including a resistive device coupled to said first and second means for combining said direct current potentials, and an indicating device for providing said tuning signal coupled to said control means and responsive to the combined potentials for indicating the same and thereby the tuning of the receiver, said resistive device including first and second resistive elements coupled to said first and second means respectively for combining said direct current potentials, said resistive elements superimposing said direct current potentials in parallel for controlling said indicating device.

2. An indicator as claimed in claim 1, wherein said receiver includes an indicator tube, said indicating device being constituted by said indicator tube.

3. An indicator as claimed in claim 1 wherein said first means includes a rectifying device for rectifying the signal in said intermediate frequency amplifier.

4. A tuning indicator as claimed in claim 1, in which the intermediate frequency signals are derived from a radio frequency intermediate frequency amplification device provided with a sound trap, said resistive device including a resistive element coupled to the output of the intermediate frequency amplifier.

References Cited in the file of this patent

UNITED STATES PATENTS 2,773,119 Parker ---------------- Dec. 4, 1956